United States Patent
Föll et al.

(10) Patent No.: US 7,880,427 B2
(45) Date of Patent: Feb. 1, 2011

(54) METHOD FOR OPERATION OF A TWO-STRANDED ELECTRONICALLY COMMUTATED MOTOR, AND MOTOR FOR CARRYING OUT SAID METHOD

(75) Inventors: Claus Föll, Reute (DE); Frank Jeske, St. Georgen (DE); Arnold Kuner, St. Georgen (DE); Jens Löffler, St. Georgen (DE)

(73) Assignee: EBM-PAPST St. Georgen GmbH & Co. KG, St. Georgen (DE)

( * ) Notice: Subject to any disclaimer, the term of this patent is extended or adjusted under 35 U.S.C. 154(b) by 826 days.

(21) Appl. No.: 11/816,828

(22) PCT Filed: Jan. 20, 2006

(86) PCT No.: PCT/EP2006/000483

§ 371 (c)(1),
(2), (4) Date: Aug. 22, 2007

(87) PCT Pub. No.: WO2006/089605

PCT Pub. Date: Aug. 31, 2006

(65) Prior Publication Data

US 2010/0283419 A1     Nov. 11, 2010

(30) Foreign Application Priority Data

Feb. 24, 2005   (DE) .................. 20 2005 003 414 U (51) Int. Cl.
*H02P 7/29* (2006.01)
(52) U.S. Cl. .................. 318/811; 318/599; 318/400.01; 388/811
(58) Field of Classification Search ........... 318/599, 318/811, 400.01, 400.07, 400.08, 400.28, 318/400.29, 471; 388/811, 804, 819, 829
See application file for complete search history.

(56) References Cited

U.S. PATENT DOCUMENTS

| | | | |
|---|---|---|---|
| 5,731,674 A | 3/1998 | Jeske | 318/439 |
| 6,008,603 A * | 12/1999 | Jones et al. | 318/400.32 |
| 6,188,187 B1 | 2/2001 | Harlan | 318/254 |
| 6,288,507 B1 | 9/2001 | Makino et al. | 318/293 |
| 6,683,434 B2 | 1/2004 | Murata et al. | 318/727 |
| 6,703,803 B2 * | 3/2004 | Ohiwa et al. | 318/400.17 |
| 6,809,497 B2 | 10/2004 | Kudo et al. | 318/727 |
| 6,828,748 B2 * | 12/2004 | Horng et al. | 318/599 |

(Continued)

*Primary Examiner*—Walter Benson
*Assistant Examiner*—Eduardo Colon
(74) *Attorney, Agent, or Firm*—Milton Oliver, Esq.; Oliver Intellectual Property LLC (57) ABSTRACT

A two-stranded electronically commutated DC motor has a permanent-magnet rotor (36), power supply terminals (28, 30) for connecting the motor to a current source (22) and a stator (102) having a winding arrangement which includes first and second winding strands (52, 54). The latter are controlled by respective first and second semiconductor switches (70, 80). The motor also has a third controllable semiconductor switch (50), arranged in a supply lead from one of the terminals (28, 30) to the winding strands (52, 54), which third switch is alternately switched on and off by applying to it a PWM (Pulse Width Modulated) signal 24. During switch-off intervals, magnetic flux energy stored in the motor causes a decaying loop current (i2) to run through the windings, continuing to drive the rotor. This facilitates conformal mapping of temperature information in the PWM signal onto a target motor rotation speed.

23 Claims, 4 Drawing Sheets

U.S. PATENT DOCUMENTS

| | | | |
|---|---|---|---|
| 6,879,120 B2 * | 4/2005 | Xi ........................ | 318/400.01 |
| 7,554,279 B2 * | 6/2009 | Loffler et al. .......... | 318/400.07 |
| 2002/0039014 A1 | 4/2002 | Kudo et al. ................ | 318/727 |
| 2006/0186846 A1 * | 8/2006 | Lassen ...................... | 318/439 |

* cited by examiner

METHOD FOR OPERATION OF A TWO-STRANDED ELECTRONICALLY COMMUTATED MOTOR, AND MOTOR FOR CARRYING OUT SAID METHOD

CROSS-REFERENCE

This application is a section 371 of PCT/EP2006/00483, filed 20 Jan. 2006, and published 21 Aug. 2006 as WO 2006-089605-A. It further claims priority from German application DE 20 2005 003 414.2, filed 24 Feb. 2005, which is incorporated by reference.

FIELD OF THE INVENTION

The present invention relates to a method of operating a two-stranded electronically commutated motor, and to a motor adapted for carrying out such a method. The invention refers preferably to motors of low and moderate output such as those used to drive fans that could be characterized, for example, using the term "compact fans" or "equipment fans," e.g. in an output range from approximately 0.5 W to approximately 30 W, preferably approximately 3 W to approximately 20 W.

BACKGROUND

In the context of such fans, a desire exists for them to run at full output, i.e. at a rotation speed of, for example, 4000 rpm, only when the temperature of the object to be cooled is high. It is possible for this purpose, by means of a sensor on or in said object, to generate a temperature signal, and with that a PWM (Pulse Width Modulated) signal whose duty factor depends on the temperature of said object, so that, for example, at a temperature of 20° C., the duty factor is low and the fan consequently runs slowly, since little heat needs to be removed. If, in contrast, the temperature of the object is 70° C., the duty factor is then increased to, for example, 80% and the fan runs correspondingly faster, so that the larger quantity of heat can reliably be dissipated.

The result of this is that such fans have a longer service life, and at low temperatures a fan of this kind is almost or entirely inaudible, since it is running slowly.

With fans of this kind, which must be very inexpensive, the problem arises of mapping the temperature information contained in a PWM signal of the kind described onto the rotation speed of the motor or fan as completely as possible and in the manner of a conformal mapping; in other words, as little as possible of this temperature information should be lost.

For example, it may be that a rotation speed of 15% of the maximum rotation speed of the fan should correspond to a duty factor of 15%, a rotation speed of 20% of maximum speed to a duty factor of 20%, etc.

If, as a result of peculiarities of the circuit and the design of the motor, the latter works in such a way that the rotation speed consistently has a value of 15% of the maximum rotation speed in a duty factor range from 15 to 50%, and rises only above a duty factor of 50%, the temperature information in the duty factor range from 15% to 50% is therefore lost. This is undesirable, because conformal mapping is not taking place, and because the risk exists that the object to be cooled will overheat.

SUMMARY OF THE INVENTION

It is therefore an object of the invention to make available a novel method of operating a two-stranded electronically commutated motor, and a motor for carrying out such a method.

According to the invention, this object is achieved by using a commutation controller to actuate first and second semiconductor switches, each arranged in series with a respective winding strand of the motor stator, and also periodically interrupting power supply to the windings by using a third semiconductor switch, located between the DC power source and the motor windings, and controlled by a PWM (Pulse Width Modulated) signal, with the result that, during switch-off intervals, a decaying loop current flows in the windings, and continues to drive the rotor of the motor. When the third semiconductor switch is blocked, energy delivery from the DC source to the one winding strand that is at that instant switched on is interrupted. But because the current in this one winding strand attempts to continue flowing without change, it continues to flow in the one and in the other winding strand. This current flows through the other winding strand, however, in a direction opposite to the "normal" direction, so that the current acts in driving fashion in the other winding strand as well.

Because the current, flowing through the two winding strands in this state separated from the DC source, jumps from a larger to a smaller value in the manner of a jump function, energy stored in the magnetic circuit of the motor continues to be used to drive the rotor, and little or no reactive power is generated.

When the third semiconductor switch is then switched back on, energy is once again delivered from the DC source. The current in the other winding strand jumps immediately back to zero, and the current in the one winding strand jumps back to its full value, since here as well a jump function takes effect because at the instant of the jump, nothing changes in terms of the energy content of the magnetic circuit of the motor. As a consequence of this jump, the full drive energy is then once again generated by the current flowing through the one winding strand, while the contribution of the other winding strand returns to zero.

Another manner of achieving the stated object is provided by a motor structure in which first and second semiconductor switches are respectively arranged in series with first and second stator winding strands, and the winding-remote terminals of the switches (e.g. their source terminals) are connected via a diode to a ground bus. When a PWM signal having a variable duty factor is used to control the third semiconductor switch, the motor can convert this duty factor into a rotation speed in such a way that the information contained in the duty factor is appropriately converted into a corresponding rotation speed; or, in other words, that little or none of the information contained in the duty factor is lost. This is particularly important when the motor drives a fan and the rotation speed of the fan is controlled by a temperature, since in this context the motor rotation speed should increase approximately monotonically when the monitored temperature rises monotonically.

BRIEF FIGURE DESCRIPTION

Further details and advantageous refinements of the invention are evident from the exemplifying embodiments, in no way to be understood as a limitation of the invention, that are described below and depicted in the drawings. In the drawings.

DETAILED DESCRIPTION

Figure 1:
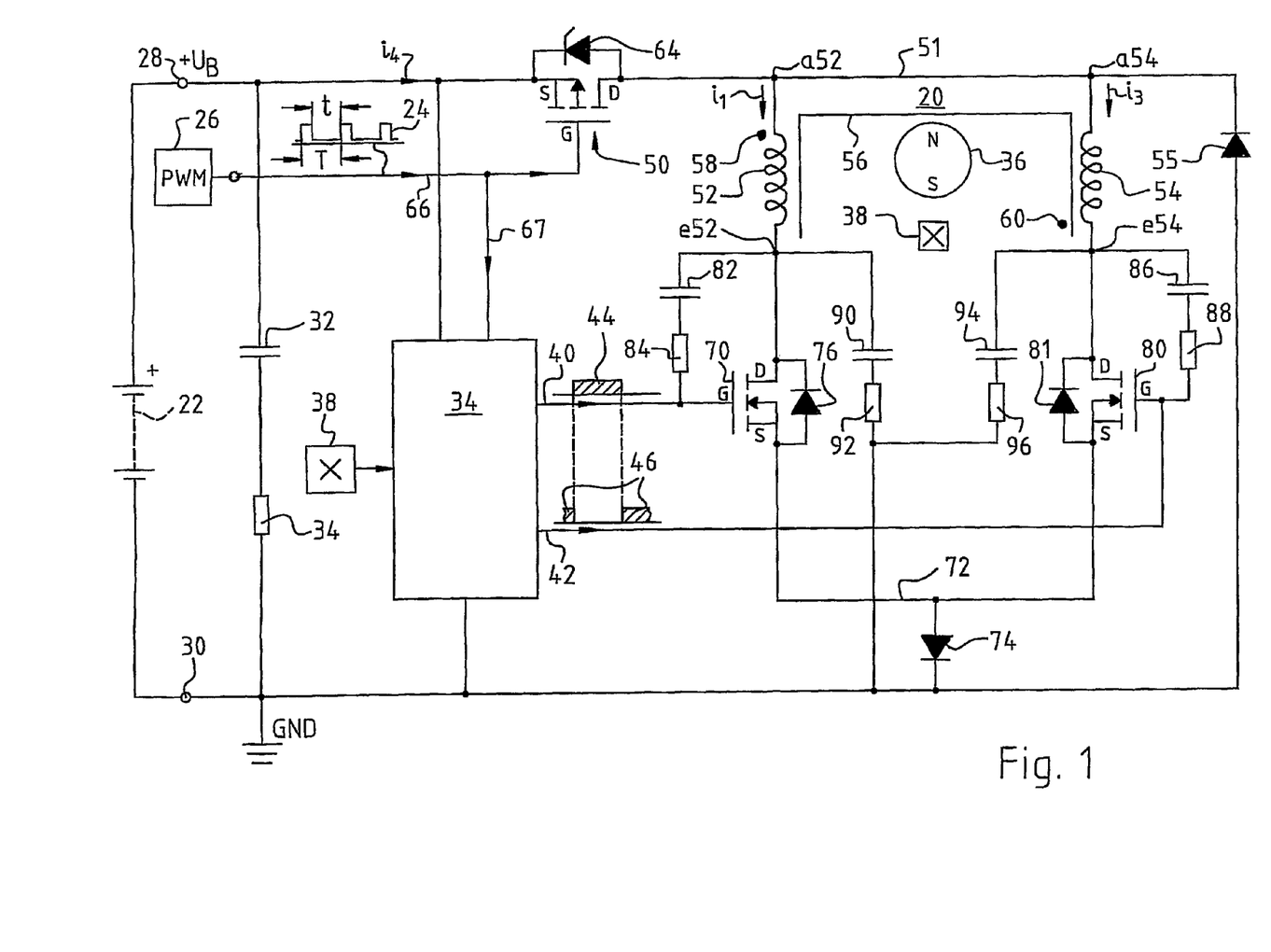
FIG. 1 is a circuit diagram of a preferred embodiment of a two-stranded electronically commutated motor whose rotation speed is controllable by a PWM (Pulse Width Modulated) signal.

FIG. 1 shows a preferred embodiment of an electronically commutated motor 20 according to the invention. The motor obtains its energy from any DC source 22, which is depicted symbolically as a battery but is usually configured as a power supply powered from an alternating-current or three-phase power grid, as is known to one skilled in the art. The left half shows a "DC link" circuit.

The rotation speed of motor 20 is controlled by means of a PWM signal 24 that is generated by any PWM generator 26 and that has, for example, a frequency in the range from 16 to 30 kHz, preferably approximately 25 kHz. The period length of signal 24 is labeled T in FIG. 1, and its pulse duration is labeled t. The ratio $$pwm = t/T * 100\% \quad (1)$$

is referred to as the "duty factor" (or "PWM duty cycle"). In other words, when t=T, the duty factor pwm=100%.

Any item of information can be encoded into this duty factor, e.g. a datum regarding temperature, relative humidity, radioactivity, etc. It is usually desirable for the rotation speed to rise with a rising duty factor, but it is also possible for the rotation speed to decrease with a rising duty factor, or for it to remain constant in certain ranges as the duty factor rises.

It is moreover often desirable for the information contained in the duty factor to be converted into a rotation speed of motor 20 according to certain rules, for example with a so-called "switch-on hysteresis."

Motor 20 has a positive terminal 28 (+UB) and a negative terminal 30 (GND). Located between these terminals is the series circuit made up of an RC element having a capacitor 32 (e.g. 470 nF) and a resistor 34 (e.g. 10 ohm). Also located between terminals 28 and 30 is a commutation controller 34, e.g. a commutation module of known design, or a correspondingly programmed microcontroller.

Motor 20 has a permanent-magnet rotor 36 that is depicted symbolically as a two-pole rotor but of course can have more than two poles, e.g. four, six, etc. poles. Rotor 36 controls a Hall IC 38 that is depicted twice in FIG. 1 and only in symbolic form, i.e. the power supply to Hall IC 38 is not depicted because it is known. Controlled by the signal of Hall IC 38, module 34 supplies to two outputs 40, 42 commutation signals 44, 46 that serve to control motor 20 (cf. FIG. 1).

Also connected to terminal 28 is source S of a p-channel MOSFET (Metal Oxide Semiconductor Field Effect Transistor) 50 whose drain D is connected via a connector 51 to upper terminals a52, a54 of two winding strands 52, 54. These strands 52, 54 preferably have a close magnetic coupling that is indicated at 56. This coupling is produced on the one hand by the magnetic circuit of motor 20, and on the other hand by the fact that the winding wires of the two strands 52, 54 are wound in parallel-wire fashion; this is referred to in practice as "bifilar" winding. As indicated by points 58, 60, strands 52, 54 generate different magnetic fields; i.e. when, for example, a current $i_1$ flows in strand 52 from upper terminal a52 to terminal e52, the North pole of rotor 36 is attracted, and when a current $i_3$ flows in strand 54 from upper terminal a54 to e54, the South pole S of rotor 36 is attracted by the same stator pole. Conversely, when a current $i_3$ (FIG. 1) flows in strand 54 from e54 to a54, it then has the same effect as a current $i_1$ flowing in strand 52 from a52 to e52, i.e. it intensifies its effect. This is explained further with reference to FIG. 4.

Provided between negative lead 30 and positive branch 51 of the "DC link" circuit is a diode 55, whose purpose will be explained below.

A Z-diode 64 is connected antiparallel to p-channel MOSFET 50. PWM pulses 24 are delivered from PWM generator 26 to gate G of this MOSFET 50 via a control lead 66. (The positive pulses block MOSFET 50.)

The current through first winding strand 52 is controlled by an n-channel MOSFET 70 whose drain D is connected to terminal e52 of strand 52, whose source S is connected to a connector 72, and to whose gate G pulses 44 are delivered from output 40 of commutation controller module 34.

Connector 72 is connected to terminal 30 via a blocking element in the form of a base diode 74. The latter prevents a current from flowing from ground terminal 30 to connector 72 when connector 72 becomes more negative than ground terminal 30.

A recovery diode 76 is arranged antiparallel to MOSFET 70. A diode of this kind is usually already integrated into MOSFET 70.

The current through second winding strand 54 is controlled by an n-channel MOSFET 80 that has a recovery diode 81 connected antiparallel to it. Drain D of MOSFET 80 is connected to terminal e54 of strand 54, and its source S is connected to connector 72. Control pulses 46 are delivered to its gate G from terminal 42 of commutation controller module 34.

Located between the gate and drain of MOSFET 70 is the series circuit made up of a capacitor 82 (e.g. 220 pF to 3.3 nF) and a resistor 84 (e.g. 510 ohm to 10 kohm). The function of this RC element is to slow down the switching operations in MOSFET 70.

The same RC element is provided analogously for MOSFET 80, namely the series circuit made up of a capacitor 86 and a resistor 88.

Also located between terminal e52 and terminal 30 is the series circuit made up of a capacitor 90 and a resistor 92 (e.g. 10 kohm), and analogously located between terminal e54 and terminal 30 is the series circuit made up of a capacitor 94 and a resistor 96. Their function is to suppress oscillations of the drain voltages of MOSFETs 70 and 80 that might otherwise occur when MOSFET 50 is shut off and switched on.

Operation

When the duty factor of PWM signal 24 is 100%, i.e. when FET 50 is continuously conductive, motor 20 receives a continuous current and operates in the usual way as a two-phase, two-pulse motor whose manner of operation is assumed to be known. ("Two-pulse" refers to a motor that has two current pulses delivered to its stator winding for each rotor revolution of 360° el.; cf. FIG. 5.)

Figure 2:
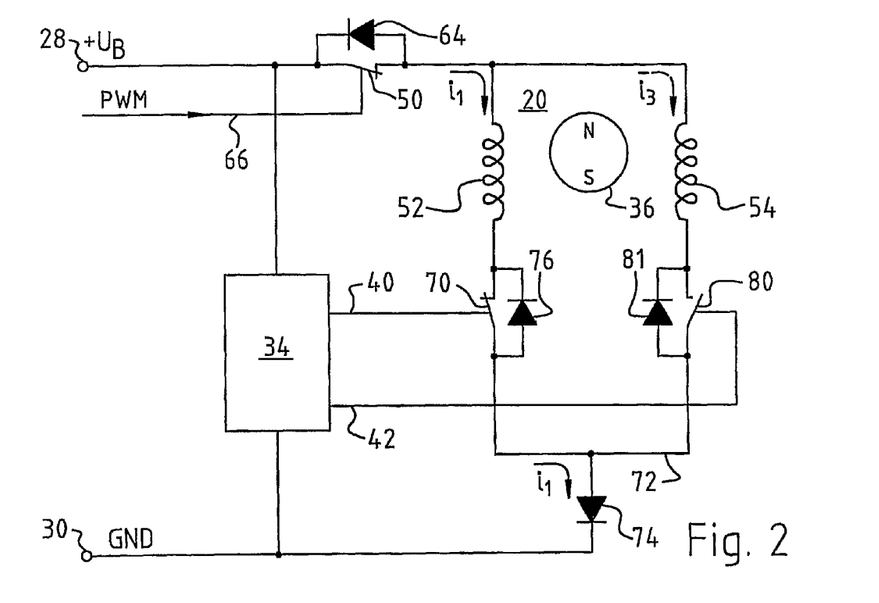
FIGS. 2 and 3 are two circuit diagrams which explain the invention.

FIG. 2 shows this state, in which FET 50 is continuously conductive and left FET 70 is made conductive by a positive signal at output 40 of module 34, while output 42 is at ground potential with the result that right FET 80 is blocked. In this case, a current $i_1$ flows from terminal 28 via FET 50, strand 52, FET 70, and base diode 74 to terminal 30.

This occurs, under the control of Hall IC 38 (FIG. 1), over a rotation angle of approximately 180° el. of rotor 36. In the case of a two-pole rotor 36 such as the one depicted in FIGS. 1 to 4, 180° el. corresponds to an angle of 180° mech., i.e. the state according to FIG. 2 persists for approximately half a mechanical revolution; during the next half-revolution, FET 70 is blocked and FET 80 is instead made conductive, with the result that a current $i_3$ flows (cf. FIG. 1). This is referred to as electronic commutation.

Figure 4:
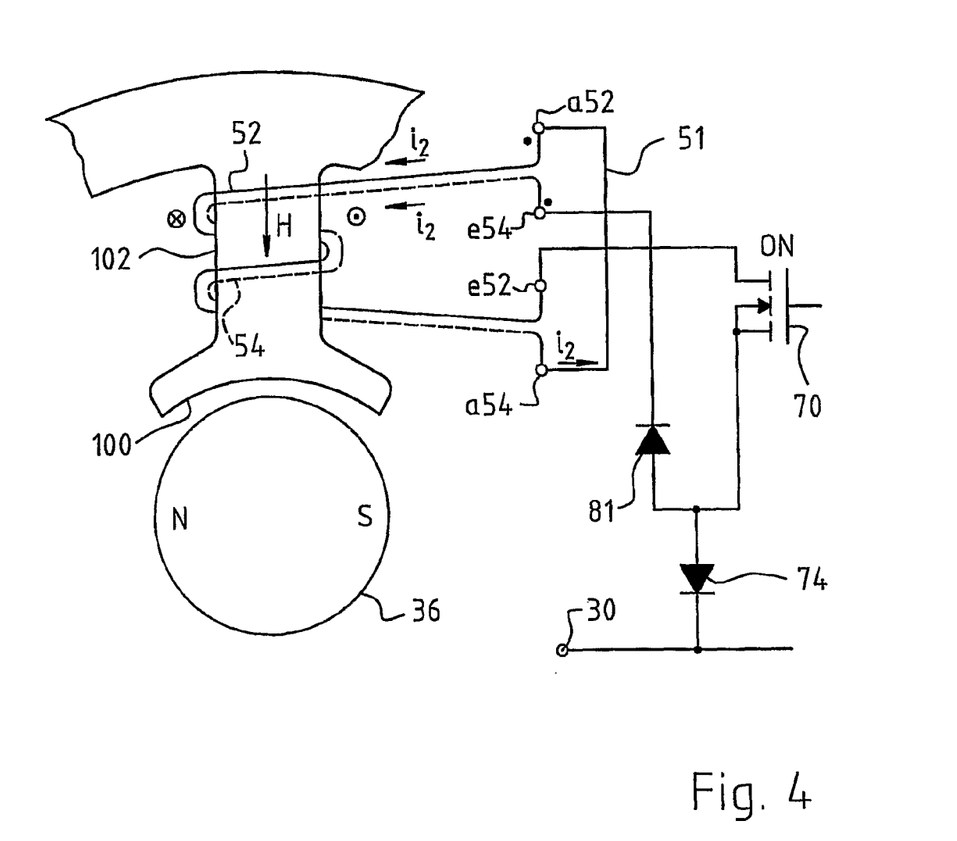
FIG. 4 is a schematic depiction to explain the manner of operation.

FIG. 4 shows a portion of a bifilar winding with strands 52 and 54. FIG. 4 is, of course, only an example; a large number of designs for two-phase, two-pulse motors is known, and the depiction according to FIG. 4 serves only to explain the manner of operation with reference to a simple example, without thereby limiting the invention to this specific design. The invention does not require a bifilar winding, but the latter is advantageous in terms of efficiency.

In the switching state according to FIG. 2, a current flows from terminal a52 to terminal e52, i.e. from top to bottom. This current produces, for example, a North pole at lower side 100 of a stator pole 102, so that the South pole of rotor 36 is attracted.

When current $i_i$ is switched off by FET 70 and FET 80 is instead switched on, current $i_3$ (FIG. 1) flows through strand 54, specifically from a54 to e54, i.e. from bottom to top in FIG. 4. This current therefore produces a South pole at lower side 100 of stator pole 102, so that the North pole of rotor 36 is attracted.

Effect of PWM Signal 24

When signal 24 has a duty factor of less than 100%, FET 50 is briefly interrupted, for example, 25,000 times per second.

Figure 3:
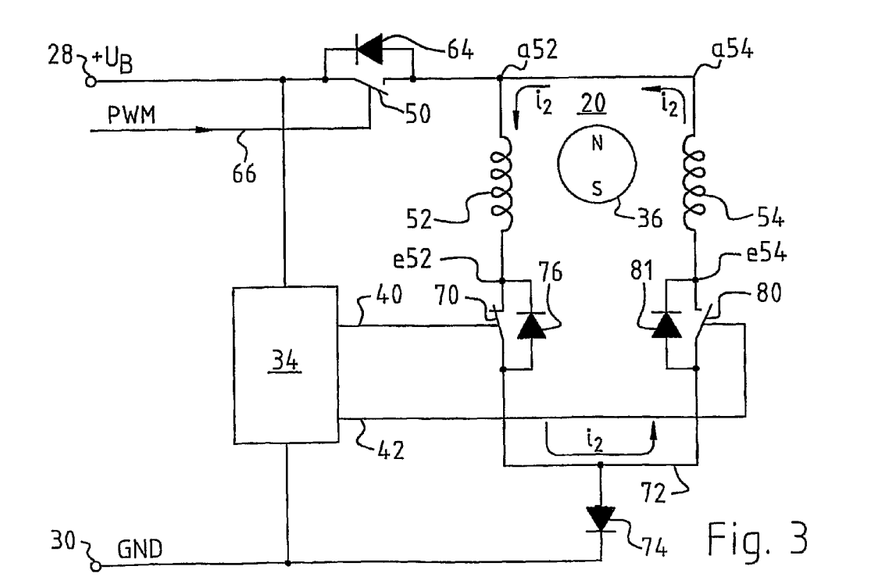

FIG. 3 shows what happens during such an interruption, at the moment when left FET 70 is conductive and right FET 80 is blocked.

No further energy can now be delivered from terminal 28 to motor 20 from DC source 22, i.e. current $i_i$ is interrupted.

In the context of an inductance, however, magnetic flux density B cannot change abruptly, so that as a result of this flux density, a current $i_2$ continues to flow through strand 52; lower terminal e52 of strand 52 becomes positive, and upper terminal a52 becomes negative. The consequence is that current $i_2$ flows through FET 70, then on through connector 72 to diode 81 and through the latter to terminal e54 of strand 54, then through the latter to terminal a54 and back to terminal a52. Current $i_2$ thus flows in a loop or circuit, and it is supplied from the decaying energy that is stored in the magnetic circuit of motor 20, and that energy is consequently converted into drive energy for rotor 36 and thereby "consumed."

FIG. 4 shows an example of the path of this current. It flows from terminal a52 from top to bottom through strand 52 to terminal e52, so that strand 52 generates a North pole at side 100 of stator pole 102.

From terminal e52, current $i_2$ flows through FET 70 and diode 81 to terminal e54 and from there, again from top to bottom, through strand 54 to terminal a54, so that strand 54 once again generates a North pole at pole side 100.

Because the magnetic flux in pole 102 does not change abruptly but merely decreases continuously because of the conversion into rotational energy of rotor 36, this means that when in FIG. 2 the magnitude of current $i_i$ is, for example, 1 A, then in FIGS. 3 and 4 current $i_2$ will be equal to only half that magnitude, i.e. 0.5 A, because of course 0.5 A is flowing through strand 52 and likewise 0.5 A through strand 54, resulting in FIG. 4 in a total current of $$2*i_2 = 2*0.5 A = 1 A.$$

This means that, in this case, a jump function exists, i.e. current $i_1$ of 1.0 A in FIG. 2 is divided into two currents of 0.5 A without thereby producing any change in the effect on rotor 36.

When FET 50 is once again made conductive by signal 24, the state according to FIG. 2 is immediately restored, i.e. the current through strand 54 immediately becomes zero, and current $i_1$ immediately jumps back to a value that is now less than 1.0 A, energy now being once again delivered from DC source 22.

When FET 50 is blocked by PWM signal 24, the current $i_1$ flowing at that instant is therefore halved but the current $$i_3 = 0.5*i_i \qquad (2)$$

flows through twice the number of windings, namely both strands 52 and 54, as depicted in FIG. 4, so that nothing changes in terms of the magnetic effect, as is evident to one skilled in the art without further explanation.

The abrupt change in current in the context of the switching operations of FET 50 is made possible by the fact there is no change in the magnetic flux through rotor pole 102 in the context of these switching operations, i.e. the magnetic energy remains unchanged at the instant of the abrupt change.

The effect of base diode 74 is that the current induced, upon shutoff of FET 50, can flow only through connector 72. Instead of diode 74, an active semiconductor switch (with no recovery diode) that is controlled by signal 24 could also be used, but this solution is more complex.

In order to improve efficiency, it is advantageously possible to make both FETs 70 and 80 conductive, via a connector 67 that leads from PWM generator 26 to commutation module 34, simultaneously with the blocking of FET 50, since the voltage drop at a conductive FET is less than the voltage drop at a current-carrying diode.

Upon blockage of FET 50, the potential at its drain D becomes negative, i.e. there occurs there, because of the inductance of winding strand 52 or 54, a negative voltage peak whose height depends on the coupling factor of the bifilar winding (cf. FIG. 4) and on the switching speed of FET 50.

There are two possibilities for limiting this negative voltage peak (without having to switch FET 50 more slowly):

a) Z-diode 64 that is arranged between the drain and source of FET 50. This diode cuts off the negative voltage peak as soon as it reaches a specific amplitude.

or:

b) Diode 55, whose cathode is connected to drain D of FET 50 and whose anode is connected to terminal 30 (GND).

FIG. 1 shows both variants. Both variants harmonize with the procedure for loop current $i_2$ depicted in FIG. 3 and do not negatively affect it.

Both variants are advantageous because with them, the switching speed of FET 50 does not need to be slowed down. If that were done, what might result would be a correlation, between duty factor pwm and the rotation speed of motor 20, that greatly deviates from linearity.

The invention provides the advantage that by modifying the duty factor of signal 24, motor current $i_4$ (FIG. 1), and therefore also the rotation speed of motor 20, can be modified over a wide range in low-noise, almost linear, and EMC-compliant fashion so that, for example, a duty factor of 20-100% also corresponds to a rotation speed change of approximately 20-100% of maximum rotation speed. This would not be possible if FETs 70 and 80 were directly controlled by PWM signal 22. Experiments by the Applicant have shown that, in this case, motor 20 simply remains at a standstill at a duty factor below 50%.

Using PWM signal 24 in the context of the invention, it is therefore possible to control motor 20 directly without needing to modify said signal with electronic manipulations. Such manipulations are of course also not precluded within the scope of the invention, for example in order to generate a hysteresis already described.

It is also very important that the FETs 70 and 80 that produce electronic commutation do not experience greater stress as a result of the above-described switching operations in FET 50, since upon blockage of FET 50, the current in FET 70 or 80 that is conductive at that instant temporarily drops by half, so that the power dissipation also correspondingly drops.

Intelligent utilization of the flux energy stored in the magnetic circuit of motor 20, which energy is used in the invention to drive rotor 26 during the periods in which FET 50 is not conducting a current, produces only a little energy in the form of reactive power during the switching operations, so that a small size is sufficient for capacitor 32, e.g. 100 to 470 nF. If FETs 70 and 80 were controlled directly using signal 24, a far larger buffer capacitor would be needed, for which no room would be available specifically in compact fans. Such a capacitor would also, because of its limited service life, implicitly shorten the service life of motor 20 and would not be capable of being processed as an SMD (Surface Mounted Device) component.

The result of Z-diode 64 or diode 55 is that the negative voltage peaks occurring at FET 50 during operation are substantially damped.

The result of RC element 32, 34 in coaction with diode 74 is to reduce the voltage increases in DC link circuit 51 that occur during normal commutation of motor 20.

Because the motor current flows through both strands 52, 54 during PWM operation, the invention produces a kind of hybrid between a two-pulse motor having two strands and a two-pulse motor having only one strand, so that overall efficiency is improved because the consequence of digital switching is that large losses do not occur in FET 50. This allows a unit having somewhat lower performance to be used for FET 50, thus decreasing costs.

Figure 5:
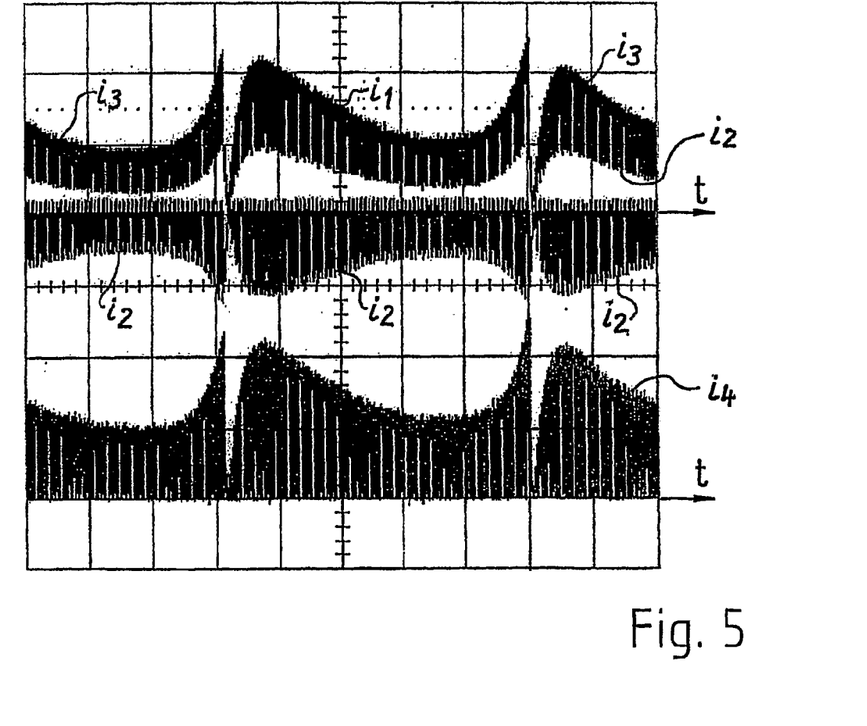
FIG. 5 is a set of oscillograms to explain the invention.

FIG. 5 is a set of oscillograms of the currents in motor 20. Current $i_4$ that flows out of current source 22 into motor 20 is depicted at the bottom. For a pwm <100%, this current continuously varies between a value of zero and an instantaneous maximum value, since FET 50 is switched off and on, for example, 25,000 times per second.

Also depicted are currents $i_1$, $i_2$, and $i_3$ whose significance is evident from FIGS. 1 to 4.

For a pwm <100%, current $i_1$ (and likewise current $i_3$) in the switched-on strand continuously jumps between 50 and 100%, as described in detail with reference to FIG. 4.

For a pwm <100%, current $i_2$ in the switched-off strand jumps between 0 and 50% with reference to the instantaneous value of current $i_4$.

Assuming that the motor is running at 6000 rpm, this corresponds to 100 revolutions per second. One revolution therefore takes 0.01 second.

If the PWM signal has a frequency of 25,000 Hz, this then yields, for each complete rotor revolution, a number Z:

$$Z = 25,000 * 0.01 = 250 \quad (3)$$

of current interruptions produced by FET 50.

The duration of these interruptions is a function of duty factor pwm, and the latter consequently determines the actual value of currents $i_1$, $i_2$, $i_3$, and $i_4$ and thereby the rotation speed of motor 20.

Base diode 74 is particularly important for the commutation operation: When FET 50 is conductive while commutation is occurring, then for example, the previously conductive FET 70 is shut off and the previously blocked FET 80 is switched on.

The shutoff of current $i_1$ causes a positive potential at point e52, and that potential is transferred in transformer fashion from strand 52 to strand 54, so that point e54 therein becomes more negative and its potential can drop below the potential of point 30 (GND), so that, without diode 74, a current would flow from point 30 to connector 72.

This could cause the source of the FET to become so negative that FET 70 would begin to conduct again and end up in a high-resistance state.

Diode 74 prevents this, since, in such a case, it blocks, so that no current can flow from point 30 to connector 72, and the shutting-off FET (in this case FET 70) remains blocked.

The shape of currents $i_t$ to $i_4$ is a function of the shape of the voltage induced by rotor 36 as it rotates in strands 52 and 54. This shape is characteristic of electronically commutated motors, whose rotors have an approximately trapezoidal magnetization of the rotor poles with narrow pole gaps. This type of preferred magnetization of the rotor poles has proven very valuable within the scope of the present invention.

Many variants and modifications are of course possible, within the scope of the present invention. For example, transistors 50, 70, and 80 could also be implemented as bipolar transistors, although FETs are preferred.

What is claimed is:

1. A method of operating an electronically commutated motor having
    two winding strands (52, 54),
    a permanent-magnet rotor (36);
    terminals (28, 30) for connecting the motor to a current source (22);
    a stator (102) having a winding arrangement, which arrangement comprises a first winding strand (52) that has a first controllable semiconductor switch (70) associated with it in order to control current in the first winding strand (52), and a second winding strand (54) that has a second controllable semiconductor switch (80) associated with it in order to control current in the second winding strand (54),
    the first semiconductor switch (70) and the second semiconductor switch (80) together defining a subset of semiconductor switches and serving for electronic commutation;
    a field-effect transistor (50) arranged in a supply lead from a terminal (28) to the winding strands (52, 54);
    an apparatus (74) for preventing a return current, which apparatus is arranged in a common supply lead (72) to the semiconductor switches of the subset;
    said method comprising the steps of:
    as a function of a desired operating state of the motor (20), applying a PWM signal (24) to a control input (G) of the field-effect transistor (50) to alternately switch it on and off without thereby turning off a currently conductive one of said subset (70, 80) of semiconductor switches, so that in operation, subsequent to a blockage of the field-effect transistor (50), a decaying loop current ($i_2$, $i_3$) flows through the semiconductor switch of the subset that is conductive at that instant, and through the other semiconductor switch of the subset or a recovery diode (76, 81) associated with the latter, and through the first and the second winding strand (52, 54), which loop current generates a torque in the motor (20).

2. The method according to claim 1, wherein one winding strand (52) is connected to a terminal (D) of the controllable semiconductor switch (70) associated with said strand, and the other terminal (S) of said controllable semiconductor switch (70) is connected, via an electrical connector (72), to the corresponding other terminal (S) of the controllable semiconductor switch (80) connected to the other winding strand (54), and a blocking element (74) that makes a current possible only in a predetermined direction is provided in the supply lead from the terminal (30) to said electrical connector (72).

3. The method according to claim 1, further comprising orienting the winding strands (52, 54) in a configuration with respect to each other which forms a magnetic coupling (56).

4. The method according to claim 3, further comprising providing in said motor stator a ferromagnetic stator element (102) that is configured so that it magnetically couples the winding strands (52, 54).

5. The method according to claim 1, further comprising providing
a diode (64), connected antiparallel to the field-effect transistor (50).

6. The method according to claim 5, wherein the diode connected in antiparallel is a Z-diode (64).

7. The method according to claim 1, further comprising arranging an RC element (32, 34) between power source terminals (28, 30) of the motor.

8. The method according to claim 1, further comprising:
slowing down a switching frequency of at least one of said subset of semiconductor switches (70, 80) by connecting each one of said subset of semiconductor switches (70, 80) in series with a respective winding strand (52, 54), and
connecting a respective RC element (82, 84; 94, 96) between a control electrode (G) of each switch of said subset (70, 80) and a junction between an end of a winding strand and a winding-adjacent terminal (D) of each switch of said subset (70, 80).

9. The method according to claim 1, further comprising connecting a respective semiconductor switch (70, 80) in series with a respective one of said strands,
and in order to reduce oscillations at winding-adjacent electrodes (D) of said semiconductor switches (70, 80) connecting a respective RC element (90, 92; 94, 96) from said winding-adjacent electrode (D) to ground (30).

10. The method according to claim 1,
wherein the field-effect transistor (50) is connected, at its output (51) connected to the winding strands (52, 54), to the one electrode of a diode (55) whose other electrode is connected to the other terminal (30) of the motor, in order to limit voltage peaks that occur in the context of switching operations of the field-effect transistor (50) at the latter's motor-side output.

11. A two-stranded electronically commutated DC motor comprising:
a permanent-magnet rotor (36);
power supply terminals (28, 30) for connecting the motor to a current source (22);
a stator (102) having a first winding strand (52) that has associated with it a first controllable semiconductor switch (70) in order to control current in the first winding strand (52), and a second winding strand (54) that has associated with it a second controllable semiconductor switch (80) in order to control current in the second winding strand (54),
the first semiconductor switch (70) and second semiconductor switch (80) together defining a subset of semiconductor switches which serve for electronic commutation;
a field-effect transistor (50) arranged in a supply lead from one of the power supply terminals (28, 30) to the winding strands (52, 54), the control electrode (G) of which transistor is controllable by a PWM signal (24);
a device (74) for preventing a return current, which device is arranged in a common supply lead (72) to the semiconductors (70, 80) of the subset; and
as a function of a desired operating state of the motor (20), means (26) for alternately switching on and off the field-effect transistor (50) without thereby turning off a currently conductive switch of the subset (70, 80) so that in operation,
subsequent to a blockage of the field-effect transistor (50), a decaying loop current ($i_2$, $i_3$) flows through the semiconductor switch of the subset that is conductive at that instant, and through the other semiconductor switch of the subset or a recovery diode (76, 81) associated with the latter, and through the first and the second winding strand (52, 54), which loop current generates a torque in the motor.

12. The motor according to claim 11, wherein
one winding strand (52) is connected to a terminal (D) of the semiconductor switch (70) associated with it, and the other terminal (S) of said semiconductor switch (70) is connected, via an electrical connector (72), to the corresponding other terminal (S) of the semiconductor switch (80) connected to the other winding strand (54),
and a blocking element (74), that makes a current possible only in a predetermined direction, is provided in the supply lead from one of the terminals (28, 30) to said electrical connector (72).

13. The motor according to claim 11, wherein
the winding strands (52, 54) exhibit a magnetic coupling (56).

14. The motor according to claim 13, further comprising
a ferromagnetic stator element (102) that is configured so that it magnetically couples the winding strands (52, 54).

15. The motor according to claim 11, wherein
a diode (64) is connected antiparallel to the field-effect transistor (50).

16. The motor according to claim 11, wherein
an RC element (32, 34) is arranged bridging the power supply terminals (28, 30) of the motor.

17. The motor according to claim 11, wherein
the semiconductor switch (70, 80) associated with each of the two winding strands (52, 54) is connected in series with said strand,
an RC element (82, 84; 94, 96) being provided between the connection of the semiconductor switch (70, 80) and associated winding strand (52, 54) and the control electrode (G) of the relevant semiconductor switch (70, 80) in order to slow down the switching speed of said semiconductor switch.

18. The motor according to claim 11, wherein
the semiconductor switch (70, 80) associated with each of the two winding strands (52, 54) is connected in series with said strand, and
in order to reduce oscillations at the electrodes (D) of said semiconductor switches (70, 80) connected to the winding strands (52, 54), at least one RC element (90, 92; 94, 96) is provided between said electrodes (D).

19. The motor according to claim 11, wherein
the field-effect transistor (50) is connected at a motor-side output (51) thereof to the one electrode of a diode (55) whose other electrode is connected to a non-energized power supply terminal (30) of the motor (20), in order to limit voltage peaks that occur in the context of switching operations of the third semiconductor switch (50) at the latter's motor-side output (51).

20. The motor according to claim 11, wherein
the permanent-magnet rotor (36) exhibits a trapezoidal magnetization of its rotor poles.

21. The motor according to claim 11, which in addition to its terminals (28, 30) for connection to a current source (22) comprises
at least one terminal (66) for connection to a source (26) of a PWM signal (24).

22. The motor according to claim 11, further comprising
a plurality of fan blades mounted on said rotor (36) and driven by energization of said windings.

23. The motor according to claim 11, wherein
the semiconductor switches (70, 80) of the subset are implemented as field-effect transistors.

* * * * *